United States Patent
Davis et al.

(10) Patent No.: US 12,299,154 B1
(45) Date of Patent: May 13, 2025

(54) SECURE DATA HANDLING DISCOVERY

(71) Applicant: Amazon Technologies, Inc., Seattle, WA (US)

(72) Inventors: Jared Curran Davis, Cedar Park, TX (US); Andrew Jude Gacek, Maple Grove, MN (US); Harsh Raju Chamarthi, San Jose, CA (US); Neha Rungta, San Jose, CA (US); Vaibhav Bhushan Sharma, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 355 days.

(21) Appl. No.: 17/663,401

(22) Filed: May 13, 2022

(51) Int. Cl.
*G06F 21/62* (2013.01)

(52) U.S. Cl.
CPC .................. *G06F 21/6218* (2013.01)

(58) Field of Classification Search
CPC .................. G06F 21/6218; G06F 21/6227
See application file for complete search history.

(56) References Cited

U.S. PATENT DOCUMENTS

| | | | |
|---|---|---|---|
| 9,397,998 B2 | 7/2016 | Ford et al. | |
| 10,148,625 B2 | 12/2018 | Widergren et al. | |
| 10,367,851 B2 | 7/2019 | Eldar et al. | |
| 10,496,839 B2 | 12/2019 | Feng et al. | |
| 2019/0073473 A1* | 3/2019 | VanderLeest | G06F 21/554 |

* cited by examiner

*Primary Examiner* — Esther B. Henderson
(74) *Attorney, Agent, or Firm* — S. Scott Foster; Kowert, Hood, Munyon, Rankin & Goetzel, P.C.

(57) ABSTRACT

Secure data handling discovery techniques model are implemented to discover access to secure data within an application. A dataflow model is generated for an application to describe a secure zone with respect to secure data. The dataflow model is then evaluated and updated when dataflows that exit the secure zone are detected. Classifications of the exits are received and used to update the dataflow model.

20 Claims, 10 Drawing Sheets

SECURE DATA HANDLING DISCOVERY

BACKGROUND

A cloud provider, or other provider network, may implement multiple network-based services. These services may provide different functionality, such as computational resources, storage resources, data transmission, among various others. Applications that utilize such services may become increasingly complex, creating challenges for understanding how data is exchanged between the resources of these services.

Figure 1A:
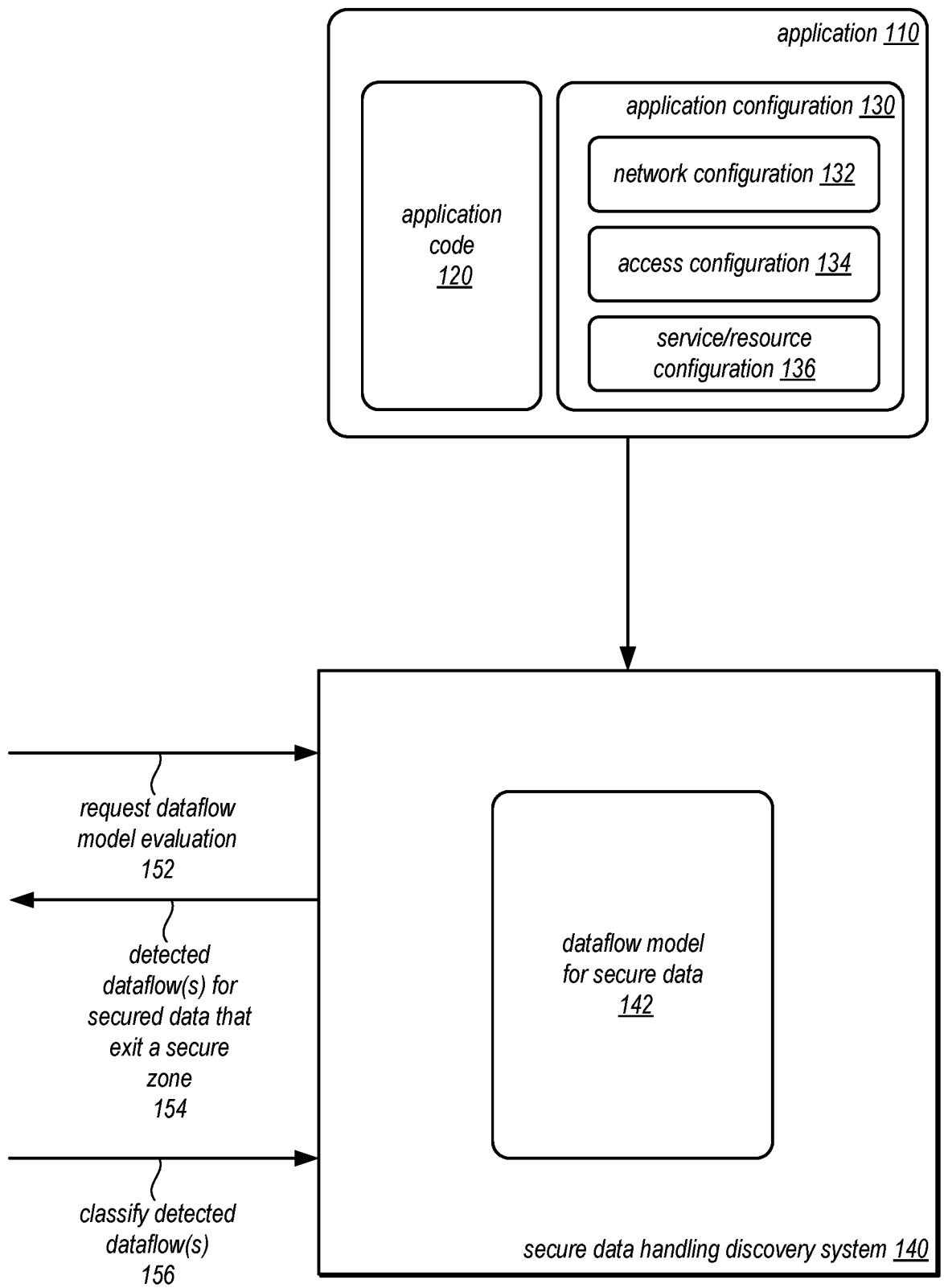
FIG. 1A illustrates a logical block diagram of secure data handling discovery, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for secure data handling discovery are described herein. Complex applications may leverage multiple sub-systems, components, and/or configurations of computing resources to implement and execute various operations (e.g., using distributed computing or microservice architectures). These applications may often utilize sensitive information which may, for various reasons (e.g., application security, customer security, etc.), need to stay private. However, given the number of potential interactions encompassed by the various network, access control, or resource configurations, as well as the application code itself, it may be difficult ascertain how secure the sensitive data is. For example, in application development and deployment workflows, significant effort may be expended to ascertain whether sensitive data stays secure (e.g., as a result of changes to application code or access configurations which may allow for unintended access to sensitive information). Because these efforts are costly in time and other resources, development and deployment of new applications or features in existing applications can be significantly slowed in order to ensure that sensitive data remains secured. Moreover, as applications change overtime, such evaluations may have to be repeatedly performed and may be subject to errors in analysis or discovery as the interaction of multiple systems and configurations can grow exponentially complex.

In various embodiments, techniques for secure data handling discovery may be implemented to integrate the identification and management of maintaining sensitive data as secure data with development tools, deployment tools, or as a standalone analysis system or service. A dataflow model that efficiently tracks dataflows with respect to secure data may be used to identify and enforce a secure zone (sometimes referred to as a "red zone") for secure data. Instead of utilizing a piecemeal analysis, which may be prone to overlooking dataflows to secure data that occur as a result of complex interactions in an application, secure data handling discovery's dataflow model can be updated and refined to grow and adapt along with changes to an application. In this way, secure data handling discovery can capture the complexity of an application within the model itself, preventing missed exits where secure data can be inadvertently or inappropriately accessed. Moreover, in those scenarios where the location of secure data is unknown, such locations can be discovered and a secure zone implemented using various access control, code, or other changes.

FIG. 1A illustrates a logical block diagram of secure data handling discovery, according to some embodiments. Secure data handling discovery system 140 may implement various techniques to discover or otherwise identify dataflows for secure data that exit a secure zone for the secure data. As illustrated in FIG. 1A, application 110 may include various features such as application code 120, which may be executed across one or multiple computing resources, and application configuration 130, which may include various aspects such as network configuration 132, access configuration 134 and service/resource configuration 136. For example, application code 120 may include the various code packages, libraries, or code files of custom and/or packaged application code to implement application 110. As application code 120 may support interactions with or operate on various types of computing resources (e.g., database systems, computational resources, such as virtual compute instances or virtual operating systems, like containers, serverless computational resources that host code snippets or functions that are executed upon demand (e.g., an API request), storage systems, networking systems or resources, among many other types of computing systems that perform various operations to generate, store, handle, or otherwise process data as part of or on behalf application 110).

Application configuration 130 may, in some embodiments, include information that is interpreted by an application deployment system or service. For example, a JavaScript Object Notation (JSON) file or Yet Another Markup Language (YAML) file, which may specify how, when, and where application 110 may be deployed, along with the configuration of computing resources to host, use, or interact with application code 120. For example, as depicted in FIG. 1A, application configuration 130 may include a network configuration 132, which may, for example, define or otherwise specify the use of various networking controls, such as virtual private networks (e.g., which may be hosted on a provider network, like provider network 200 discussed below as a "virtual private cloud."). Network configuration 132 may include various traffic shaping, routing, or other controls which may limit (or block entirely) access to various computing resources for application 110 (e.g., entering, within, or exiting a virtual private cloud).

Access configuration 134 may also be utilized as part of application configuration 130 and may be enforced by an authorization or other access management system (e.g., an identity and access management service of provider network 200). For example, applications, developers, administrators, operators, or other users/entities may have access to secure data (e.g., through application 110 or indirectly using other interfaces for computing resources). An access control system may be used to determine whether the applications, developers, administrators, operators, or other users/entities are permitted to access data, like secure data through the use of various access control settings, such as access control policies, rules, or other configuration information.

Service or resource configuration 136 may be implemented, in some embodiments, to specify the configuration of various resources, such as computational resource performance capabilities (e.g., processor, memory, storage, networking, specialized hardware, etc.) or various service (if utilized) configurations, such as performance models, automated features, like auto-scaling, or various other computing resource configurations that may be utilized to implement application 110.

As indicated in FIG. 1A, the information for application 110 may be used to generate a model, such as dataflow model for secure data 142, as discussed in detail below with regard to FIGS. 1B-8. In some embodiments, a starting request, such as a request identifying a storage location for secure data may be used to initialize the dataflow model for secure data 142. From this initial storage location, various analyses of application code 120 and application configuration 130 can be used to determine access to the secure data and generate an initial set of exit(s) from a secure zone in the dataflow model for secure data 142.

Dataflow model for secure data 142 can then be incrementally updated and analyzed in order to discover (and resolve if necessary) unwanted dataflows for secure data. In this way, secure data can remain secure even in the most complex of applications as the various influences on accessibility of secure data, such as application code 120 and application configuration 130, can be incorporated into a dataflow model and analyzed.

For example, secure data handling discovery system 140 may support requests to perform a dataflow model evaluation 152. Such a dataflow model evaluation, as discussed in detail below with regard to FIGS. 6 and 8, may be evaluated to detect a dataflow that allows secure data to exit a secure zone, as indicated at 154. These detected dataflows can then be indicated for a user to, for example, consider whether they are expected, are actually implemented as part of a secure zone, or unwanted and should be remedied (e.g., via configuration or code change). As indicated at 156, a classification of the detected data flows may be provided (e.g., as part of the secure zone or as an expected exit) may be received, allowing for dataflow model for secure data 142 to be updated accordingly. In this way, a series of interactions can be implemented which allow for new resources to be added to a dataflow model (e.g., through discovery or requests to add the resources), providing an opportunity to discover the various potential vulnerabilities of secure data for application 110. Other classifications, including expected exits, or annotations or other markings for later handling or remedy may be received. These example classifications may allow for dataflow model for secure data 142 to be adapted to account for current and future development or deployment goals.

Figure 1B:
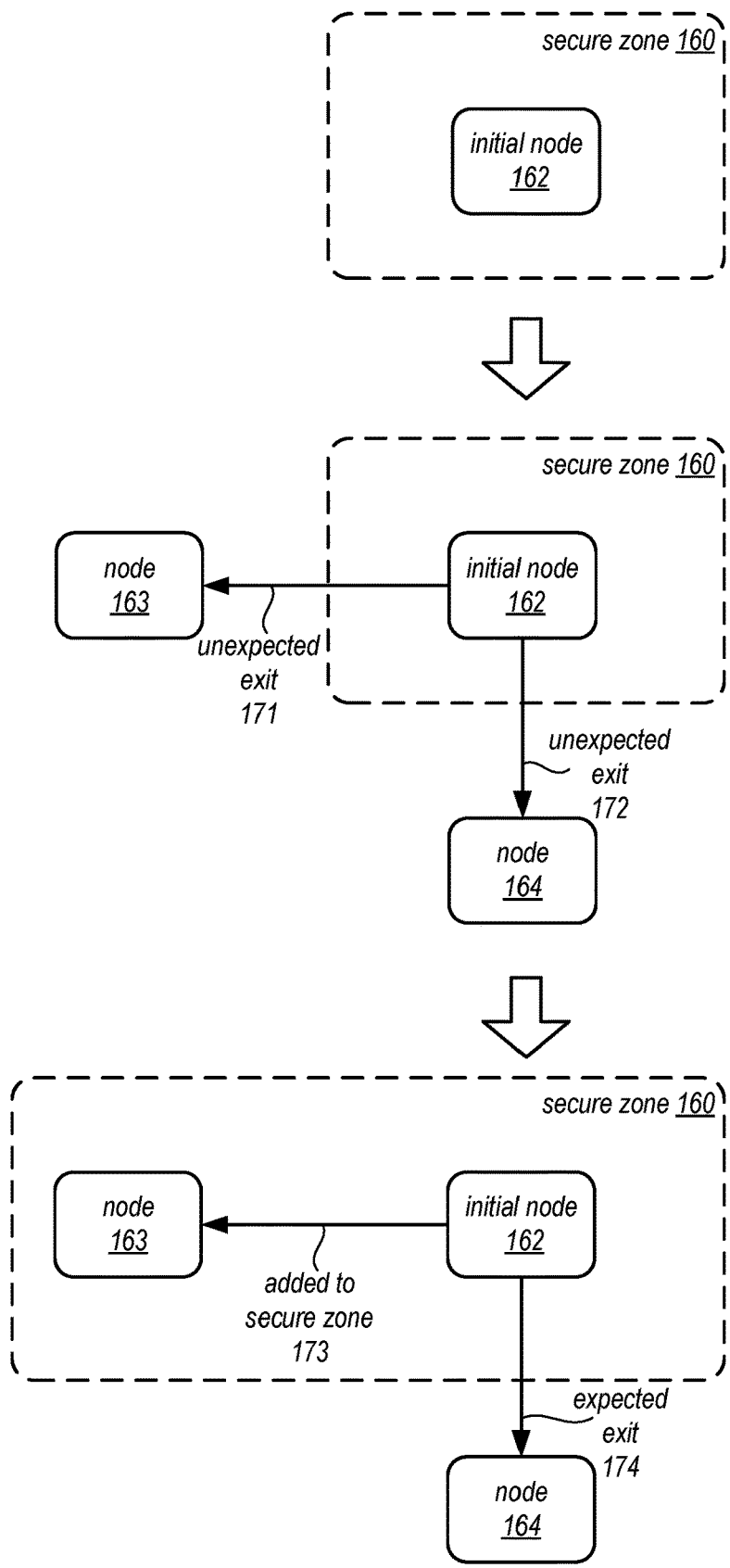
FIG. 1B illustrates a sequence of logical block diagrams depicting changes to a dataflow model over time, according to some embodiments.

FIG. 1B illustrates a series of changes to a dataflow model that may be included as part of the interactions discussed above with regard to FIG. 1A. For example, secure zone 160 may start out with an initial node 162, which may be an initial storage location for secure data (e.g., a storage object, database, file, or other location at a computing resource), as discussed in detail below with regard to FIG. 7. As evaluation is performed by secure data handling discovery system 140 (e.g., by analyzing application code 120 and/or application configuration 130), new exits from the secure zone 160 may be discovered, such as unexpected exit 171 to node 163 and unexpected exit 172 to node 164.

Classification of these exits may allow for the model to be updated. For example, requests, such as requests 156 discussed above with regard to FIG. 1A, may be received that classify unexpected exit 171 to node 163 as a process that is actually a part of secure zone 160 (e.g., a request to add node 163 to secure zone 160, as indicated at 173). For unexpected exit 172 to node 154, a classification may be received that identifies node 164 a resource that provides an expected exit for secure data, as indicated at 174.

These example classifications, along with various other received updates may allow for a dataflow model to be updated dynamically in response to various events, as discussed in detail below with regard to FIG. 8. For example, different triggers or other events (e.g., caused or driven by development tasks, such as code changes, adding or removing resources both internal to or external to a secure zone, changing or adding resource configuration or other application configuration changes, such as changes to an access control policy or deploying an application for a different testing phase) may cause the execution of an evaluation (e.g., in addition to or instead of request 152 in FIG. 1A).

The previous description of a secure data handling discovery system in FIGS. 1A-1B is a logical illustration and thus is not to be construed as limiting as to the architecture for implementing an identity and access management system.

This specification begins with a general description of a provider network that implements an secure data handling discovery service for different services across provider network regions. Then various examples of the secure data handling discovery service including different components/modules, or arrangements of components/module that may be employed as part of implementing the secure data handling discovery service are discussed. A number of different methods and techniques to implement secure data handling discovery are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
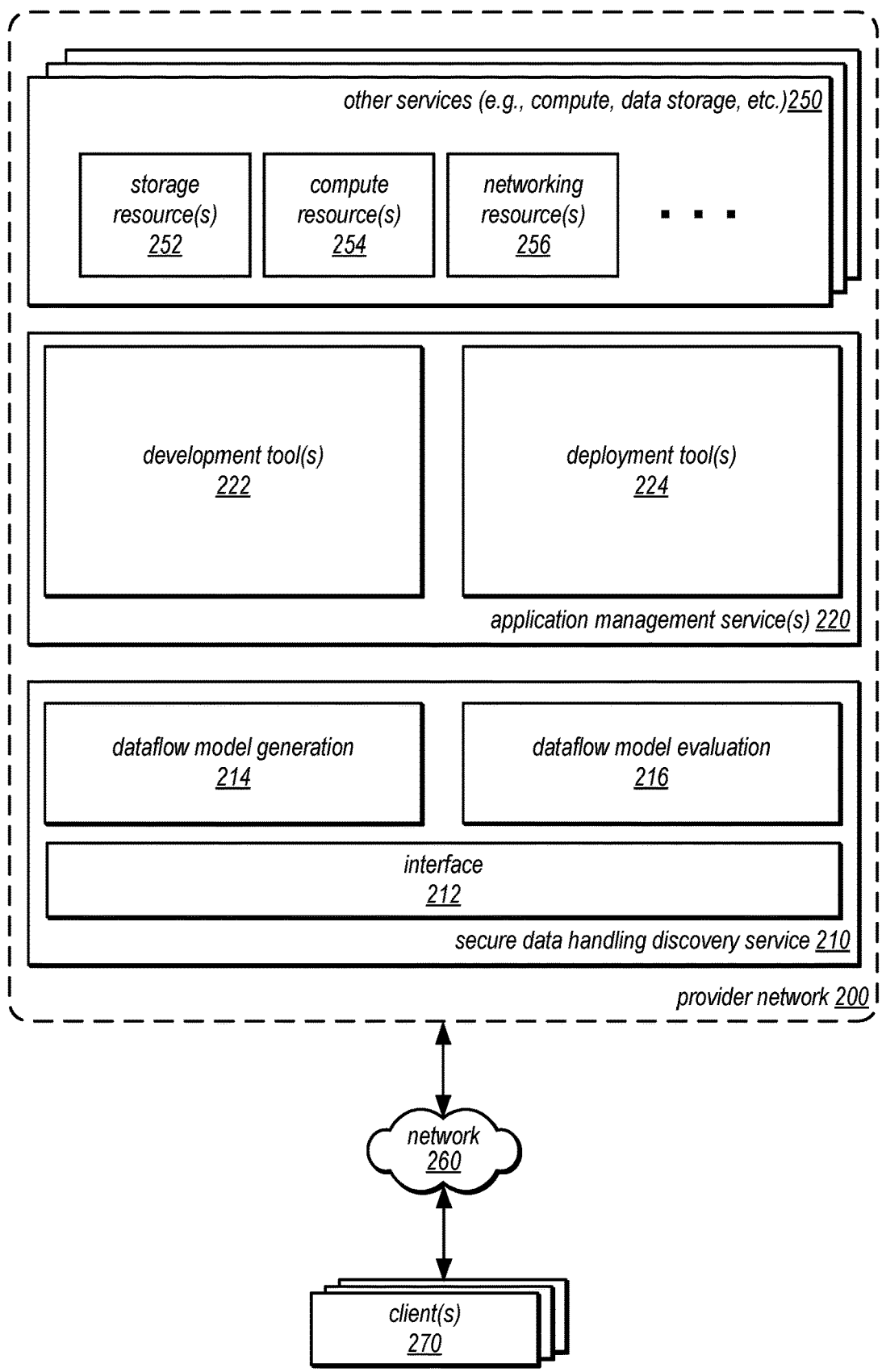
FIG. 2 is a logical block diagram illustrating a provider network implementing a secure data handling discovery service, according to some embodiments.

FIG. 2 is a logical block diagram illustrating a provider network implementing a secure data handling discovery service, according to some embodiments. In various embodiments, a provider network 200 may be a private or closed system or may be set up by an entity such as a company or a public sector organization to provide one or more services (such as various types of cloud-based storage, processing, or other computing resources) accessible via the Internet and/or other networks to clients 270. The provider network may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network.

For example, the provider network (which may, in some implementations, be referred to as a "cloud provider network" or simply as a "cloud") may refer to a pool of network-accessible computing resources (such as compute, storage, and networking resources, applications, and services), which may be virtualized or bare-metal (e.g., providing direct access to underlying hardware without a virtualization platform). In this way, the provider network can provide convenient, on-demand network access to a shared pool of configurable computing resources that can be programmatically provisioned and released in response to customer commands. These resources can be dynamically provisioned and reconfigured to adjust to variable load.

The provider network can be formed as a number of regions, such as provider network regions, where a region may be a separate geographical area in which the provider network clusters or manages data centers, in some embodiments. Each region may include two or more availability zones (sometimes referred to as fault tolerant zones) connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time. Clients 270 can connect to availability zones of the provider network via a publicly accessible network (e.g., the Internet, a cellular communication network). Regions may be connected to a global network which includes private networking infrastructure (e.g., fiber connections controlled by the cloud provider) connecting each region to at least one other region. The provider network may deliver content from points of presence outside of, but networked with, these regions by way of edge locations and regional edge cache servers. This compartmentalization and geographic distribution of computing hardware enables the provider network to provide low-latency resource access to customers on a global scale with a high degree of fault tolerance and stability.

In some embodiments, a provider network may implement various computing resources or services across one or more regions, such as secure data handling service 210, application management service(s) 220, and other services 250, which may include a virtual compute service, data processing service(s) (e.g., map reduce, data flow, and/or other large scale data processing techniques), data storage services (e.g., object storage services, block-based storage services, database services, or data warehouse storage services) and/or any other type of network-based services (which may include various other types of storage, processing, analysis, communication, event handling, visualization, identity and access control management services, and security services not illustrated). The resources used to support the operations of such services (e.g., compute and storage resources) may be provisioned in an account associated with the provider network, in contrast to resources requested by users of the provider network 200, which may be provisioned in user accounts, in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system 1000 illustrated in FIG. 9 and described below. In various embodiments, the functionality of a given system or service component (e.g., a component of secure data handling discovery service 210, application management service(s) 220 or other services 250) may be implemented by a particular node or may be distributed across several nodes. In some embodiments, a given node may implement the functionality of more than one service system component (e.g., more than one data store component).

Secure data handling discovery service 210 may implement secure data handling discovery techniques, as discussed above with regard to FIGS. 1A-1B and below with regard to FIGS. 3-8. Secure data handling discovery service 210 may provide operators of other services 250, as well as developers or other entities using various resources or services of provider network 200, with the ability to discover the ways in which secure data for various applications hosted (at least partially) in provider network 200 is being utilized, accessed, or otherwise moved.

Secure data handling discovery service 210 may implement interface 212. Interface 212 may be a programmatic interface (e.g., supporting one or more APIs), graphical (e.g., providing a web-based console or other graphical control), and/or command line interfaces, in various embodiments, to allow for the specification and management of various secure data handling discovery service 210 features, including creating, analyzing, and/or interacting with dataflow models for secure data, as discussed in detail below with regard to FIGS. 3-8.

Secure data handling discovery service 210 may implement dataflow model generation 214, as discussed in detail below with regard to FIG. 3, to generate dataflow models for understanding dataflows which could be leaks or other unintended access to secure data. Secure data handling discovery service 210 may implement dataflow model evaluation 216 to perform an evaluation of a dataflow model in order to detect additional dataflows that exit a secure zone for secure data, in some embodiments, as discussed in detail below with regard to FIG. 4.

Application management service(s) 220 may be one (or more) services for developing and/or deploying applications. For example, application management service(s) 220 may implement various development tool(s) 222, which may include various application code development or other application generation features. These development tools may be used to create applications that utilize secure data, such as an integrated development environment (IDE). Therefore, development tool(s) 222 may interface with and/or utilize the features of secure data handling discovery service 210 in order to facilitate a development process that accounts for secure data when making development decisions. For example, as discussed in detail below with regard to FIGS. 3, 4, and 8, development tools 222 may trigger or cause various evaluations of a dataflow model for secure data, provide information for generating, updating, or analyzing a dataflow model, or otherwise integrate with secure data handling discovery service 210 to ensure that various application changes, from code writing, to debug, compilation, and deployment can have secure data access considered as part of application development.

Similarly, application management service(s) 220 may implement deployment tool(s) 224, which may, among other features, start, deploy, or launch applications onto computing resources of provider network 200. Like development tool(s) 222, deployment tool(s) 224 may make use of secure data handling discovery service 210 to catch scenarios where a change in deployment (e.g., from one type of account resources to another) may cause potentially problematic access or leakage of secure data from a secure zone. For example, as discussed in detail below with regard to FIGS. 3, 4, and 8, development tools 224 may trigger or cause various evaluations of a dataflow model for secure data, provide information for generating, updating, or analyzing a dataflow model, or otherwise integrate with secure data handling discovery service 210 to ensure that various application configuration changes made as part of deployment (e.g., moving from various testing stages to a production version) can have secure data access considered as part of application deployment.

Other service(s) 250 may implement various computing resources that are used to implement applications, which may also be analyzed for secure data handling discovery. For example, storage resource(s) 252 may be data storage systems, locations, structures, databases, file systems, or other types of data storage for secure data. Compute resource(s) 254 may include various types of virtual and/or physical computing resources (e.g., virtual compute instances, operating system virtualization, like containers, function-based virtualization, such as an event driven computation service, etc.). Networking resource(s) 256 may be the various load balancers, firewalls, routers, private networks (e.g., virtual private networks or virtual private clouds), or other networking features which may be implemented for an application, and which may be considered when evaluating an application for secure data handling discovery. Each of these resources may be hosted by separate services 250 and thus may be directly configurable via interfaces of these respective services (or indirectly through application management services 220).

Generally speaking, clients 270 may encompass any type of client configurable to submit network-based requests to provider network regions 200 via network 260, including requests for other services 250 (e.g., a request to create a database, start a computation job, setup a data stream, etc.). In some embodiments, operators of a service (e.g., service 250) may be a client 270 that performs requests to interact with secure data handling discovery service 210, such as requests to evaluate or classify dataflows for a dataflow model, in some embodiments. For example, a given client 270 may include a suitable version of a web browser, or may include a plug-in module or other type of code module configured to access a management console to specify quorum controls and/or access control operations. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application configured to interact directly with provider network 200. In some embodiments, client 270 may be configured to generate network-based services requests according to a Representational State Transfer (REST)-style network-based services architecture, a document- or message-based network-based services architecture, or another suitable network-based services architecture. Although clients 270 are illustrated as external to provider network 200, in some embodiments clients of different services, like other services 250, can be implemented within provider network 200 (e.g., implemented on a resource of another service 250, such as virtual compute instance).

Clients 270 may convey network-based services requests to and receive responses from provider network 200 via network 260. In various embodiments, network 260 may encompass any suitable combination of networking hardware and protocols necessary to establish network-based-based communications between clients 270 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and provider network 200. It is noted that in some embodiments, clients may communicate with provider network 200 using a private network rather than the public Internet.

Figure 3:
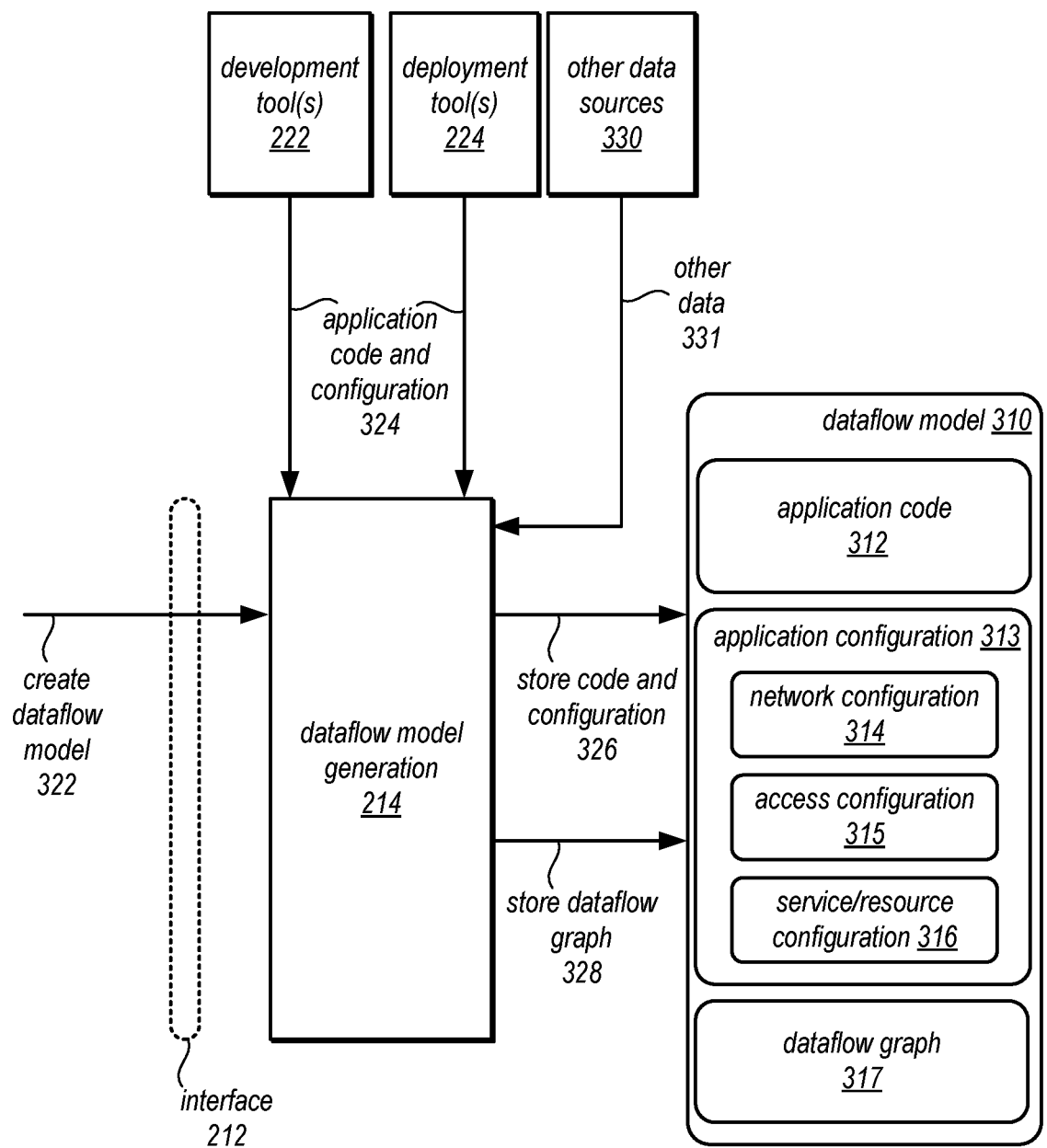
FIG. 3 is a logical block diagram of dataflow model generation, according to some embodiments.

FIG. 3 is a logical block diagram of dataflow model generation, according to some embodiments. Dataflow model generation 214 may handle requests to create dataflow models, such as a request 322. A dataflow model creation request may include the identification of secure data (e.g., as a table, data set, or other data item or collection of data items). Create dataflow model request 322 may also specify the application, project, or other identifier of the associated application code and configuration to be obtained. For example, as indicated at 324, code and configuration information 324 may be obtained from development tool(s) 222 and/or deployment tool(s) 224 using a project or application identifier that is included as part of the create dataflow model request, in some embodiments. In some embodiments, other data sources 330 may provide other data in addition to (or instead of) development tool(s)

222 and deployment tool(s) 224. For example, other services or systems of provider networks may capture (e.g., snapshot) the state of an application, including application code and/or the configuration of various application computing resources. Some services hosting computing resources used as part of an application, for instance, may provide their state information to indicate the respective configuration of resources hosted by that service. In some embodiments, the other data 331 (and application code and configuration 324 from development tool(s) 222 and deployment tool(s) 224) may be collected or requested by dataflow model generation 214 (e.g., via various requests to respective service interfaces), and then the returned results may be bundled or combined for dataflow model 310 by dataflow model generation 214.

To create dataflow model 310, dataflow model generation 214 may obtain various information incorporated into the dataflow model 310. For example, one or more requests or other protocols to obtain the code of the application and/or the configuration information from the tools via which it may be specified, such as development tools 222 and deployment tool(s) 224. As indicated at 326, this information may be stored as part of dataflow model 310, in some embodiments, for later evaluation. For example, application code 312 (or specified portions thereof) may be stored as part of dataflow model. Similarly, as part of application configuration 313, different configuration information such as network configuration 314, access configuration 315, and/or service/resource configuration 316, may be stored.

Dataflow model generation 214 may also generate an initial dataflow graph. For example, the secure data, including the storage resource, location, or system for the secure data may be specified in the dataflow graph as an initial node. This initial node may be stored in various data storage systems (e.g., graph-based databases or other types of data storage systems). As indicated at 328, this initial dataflow graph may be stored as dataflow graph 317 in dataflow model 310. Once created, dataflow model 310 may be referenceable by a client or other application, such as development tool(s) 222 and deployment tool(s) 224 for performing various secure data handling discovery techniques, as discussed in detail below with regard to FIG. 4. In some embodiments, create data flow model request 322, as discussed in detail below with regard to FIG. 7, may specify various starting information to use for model development in addition to the secure data. For instance, the secure data may, in some embodiments, have different sensitivity classifications ("Critical", "Restricted", "Highly Confidential", "Confidential", "Public"). This information may be stored along with the dataflow model 310.

Figure 4:
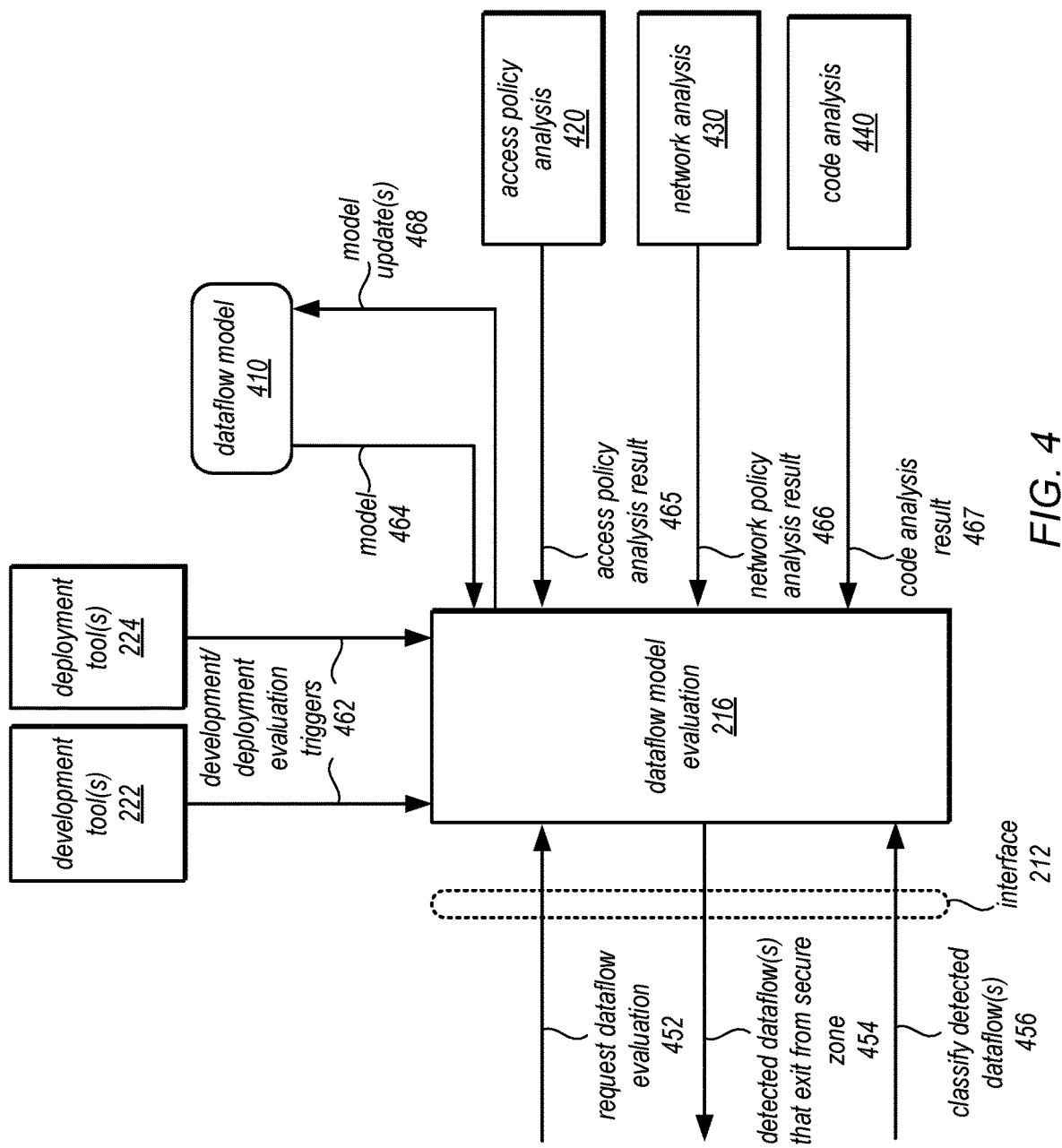
FIG. 4 is a logical block diagram of dataflow model evaluation, according to some embodiments.

FIG. 4 is a logical block diagram of dataflow model evaluation, according to some embodiments. Dataflow model evaluation 216 may be implemented, in various embodiments, in order to handle various requests or other triggering events for dataflow model evaluation. For example, a request for a dataflow evaluation for a specified dataflow model may be received, as indicated at 452 (e.g., as part of request a graphical user interface console, as described below with regard to FIG. 5). Development tool(s) 222 and deployment tool(s) 224 may also trigger evaluations through development or deployment updates, as indicated at 462. For instance, checking in or adding coded to an application may trigger a dataflow model evaluation which may include the changes to the application code as part of the evaluation. Similarly, deployment tool(s) 224 to add a new resource, move an application through various testing or deployment phases, or other information may cause a deployment update 462 that triggers dataflow model evaluation. Although not depicted, other services, systems or tools may also cause evaluation triggers. For example, changes to access control policies (or additions or removals of access control policies) at an identity and access management service may cause evaluation triggers. In another example, changes to networking configurations (e.g., various routing tables changes, security policy changes, adding or removing gateways or other entrances/exits to a virtual private cloud, etc.) may cause evaluation triggers.

As discussed below with regard to FIG. 8, dataflow model evaluation 216 may utilize the dataflow model 410 (and any updates to one or more items of the dataflow model which may be included as part of the analysis), obtaining the dataflow model 464 for evaluation. Dataflow model may utilize different forms of analysis, such access policy analysis 420, which may perform various techniques to determine the allowed actions of users, resources, or other participants in an application and provide an access policy analysis result 465. For example, dataflow model evaluation 216 may identify the one or more computing resources and the secure data for dataflow model evaluation along with any relevant access control policies that may be obtained as part of the application configuration of the dataflow model 410. A request may be submitted to an access policy analysis 420 sub-system, tool, or service (e.g., separately implemented as part of an identity and access management policy system). In some embodiments, dataflow evaluation may modify access control policies (e.g., combining multiple policies and/or insert specific resources, secure data, or other information) for access policy analysis to be performed. Access policy analysis 420 may return a result that evaluates the policies with respect to allowed or denied actions permitted by a policy (or modified policy) to determine which computing resources within (or without) of a secure zone can access secure data. For instance, a policy interpreter may be applied to evaluate the possible actions that may be taken with respect each resource and secure data combination to determine which actions are permitted. These allowed/permitted actions may be provided to dataflow model evaluation 216.

As indicated at 430, network policy analysis 430 may also be performed, which may, among other types of network analysis, analyze the network traffic rules, controls, or other features of an application (e.g., private networks, firewalls, security groups, etc.) and then provide network policy analysis result 466. For example, dataflow model evaluation 216 may identify the one or more computing resources and the secure data for dataflow model evaluation along with any relevant networking resources (e.g., virtual private clouds, gateways, virtual routers, etc.) that may be obtained as part of the application configuration of the dataflow model 410. A request may be submitted to an network analysis 430 sub-system, tool, or service (e.g., separately implemented as part of a network configuration service) to evaluate a specified networking resource (or set of resources). Network analysis 430 may then return a result that evaluates the network paths between resources and identifies which network locations (e.g., network addresses or other identifiers of computing resources, network resources, virtual private cloud boundaries, etc.) allow communications or connections to secure data. For instance, a routing tables may be evaluated to identify which connections or network traffic can be sent to storage locations of secure data (or computing resources operating or reading secure data, such as in memory). These allowed/permitted communications or connections may be provided to dataflow model evaluation 216.

As indicated at 440, code analysis may be performed to evaluate the application code itself. For instance, trace techniques may be applied to determine, functions, threads, processes, or other logic which access (e.g., read or write) secure data, in some embodiments. The results of the code analysis may be provided, as indicated at 467.

Dataflow model evaluation 216 may implement various rule sets or other heuristics to determine how the code, network policies, and/or access policies affect exits from a secure zone. For example, a process executing on another resource that is granted read privileges by an access control policy and allowed to communicate with a resource hosting the secure data (with respect to network configuration controls, such as a firewall), may be indicative of a dataflow that exits from the secure zone of the secure data. Categorization of different kinds of access or storage of secure data may be performed. For instance, secure data may be identified as "at rest" in a storage resource (e.g., database or file storage location) or "in use" (e.g., in the memory of a process or other computing resource). These categorizations, along with their location with respect to secure zone boundaries (e.g., which may be described as a set of computing resources and/or other locations of an application that are expected to have access to secure data) may be used to determine if an access to secure data found through the various analyses discussed above is within the secure zone (or not). If found, a lookup to model information 410 may be performed to determine if the access from outside of the secure zone has been classified (or not) by a user.

As indicated at 454, detected dataflow(s) that exit from a secure zone may be detected according to the results of the analysis. These detected dataflows may include information, such as destination resource for the secure data, which may be used to convey further detail about a detected dataflow that exits from a secure zone to client via interface 212.

As discussed in detail above with regard to FIG. 1, and below with regard to FIG. 6, detected dataflows may be classified, in some embodiments, and the dataflow model updated, as indicated at 468. For example, expected exits may be classified, as can classifications that include the detected dataflow as within a secure zone (e.g., expanding the secure zone to include the destination).

Figure 5:
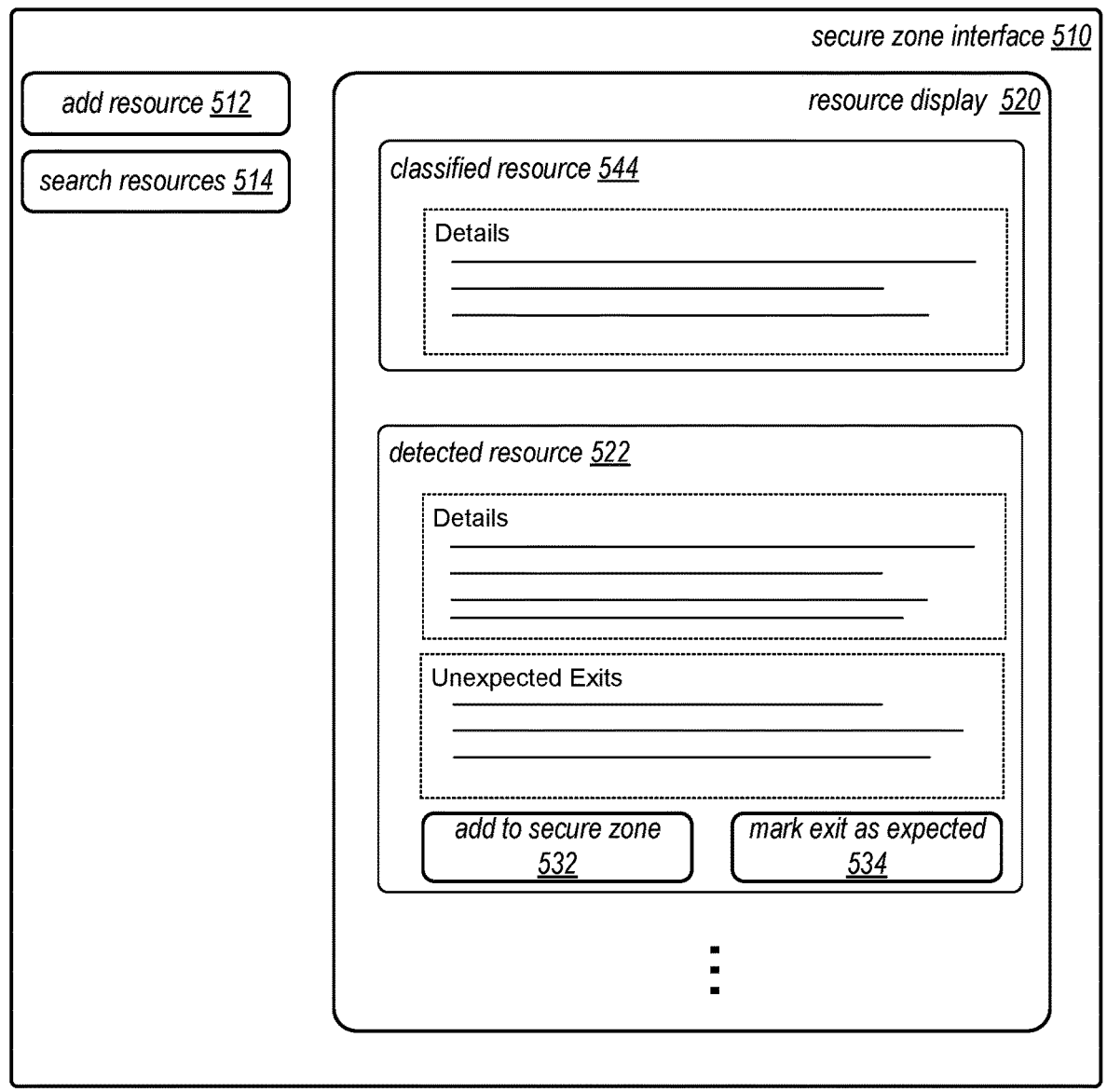
FIG. 5 is an example user interface for providing detected dataflow indications, according to some embodiments.

FIG. 5 is an example user interface for providing detected dataflow indications, according to some embodiments. Secure zone interface 510 may include user interface elements to create or add 512 resources to a secure zone. As indicated at 514, these resources may be searched. Resource display 520 may include one or more resources 522 which can be provided, including details of the resource (which may be editable), whether there is an unexpected exit, and how to handle the resource, such as to add it to the secure zone, 532 or mark as an expected exit 534. Although two example classifications 532 and 534 are illustrated, other classifications may also be provided in some embodiments. As illustrated at 544, already classified resources 544 (e.g., in a prior evaluation of the dataflow model) may be depicted as part of resource display 520.

Although FIGS. 2-5 have been described and illustrated in the context of a secure dataflow handling and discovery service, the various techniques and components illustrated and described in FIGS. 2-5 may be easily applied to other development tools, systems, or applications in different embodiments for one or multiple different systems or services, which may be public or private. As such, FIGS. 2-5 are not intended to be limiting as to other embodiments of a system that may implement secure data handling discovery.

Various different systems and devices may implement the various methods and techniques described below, either singly or working together. For example, secure data handling discovery service such as described above with regard to FIGS. 2-5 may be configured to implement the various methods. Therefore, the above examples and or any other systems or devices referenced as performing the illustrated method, are not intended to be limiting as to other different components, modules, systems, or configurations of systems and devices.

Figure 6:
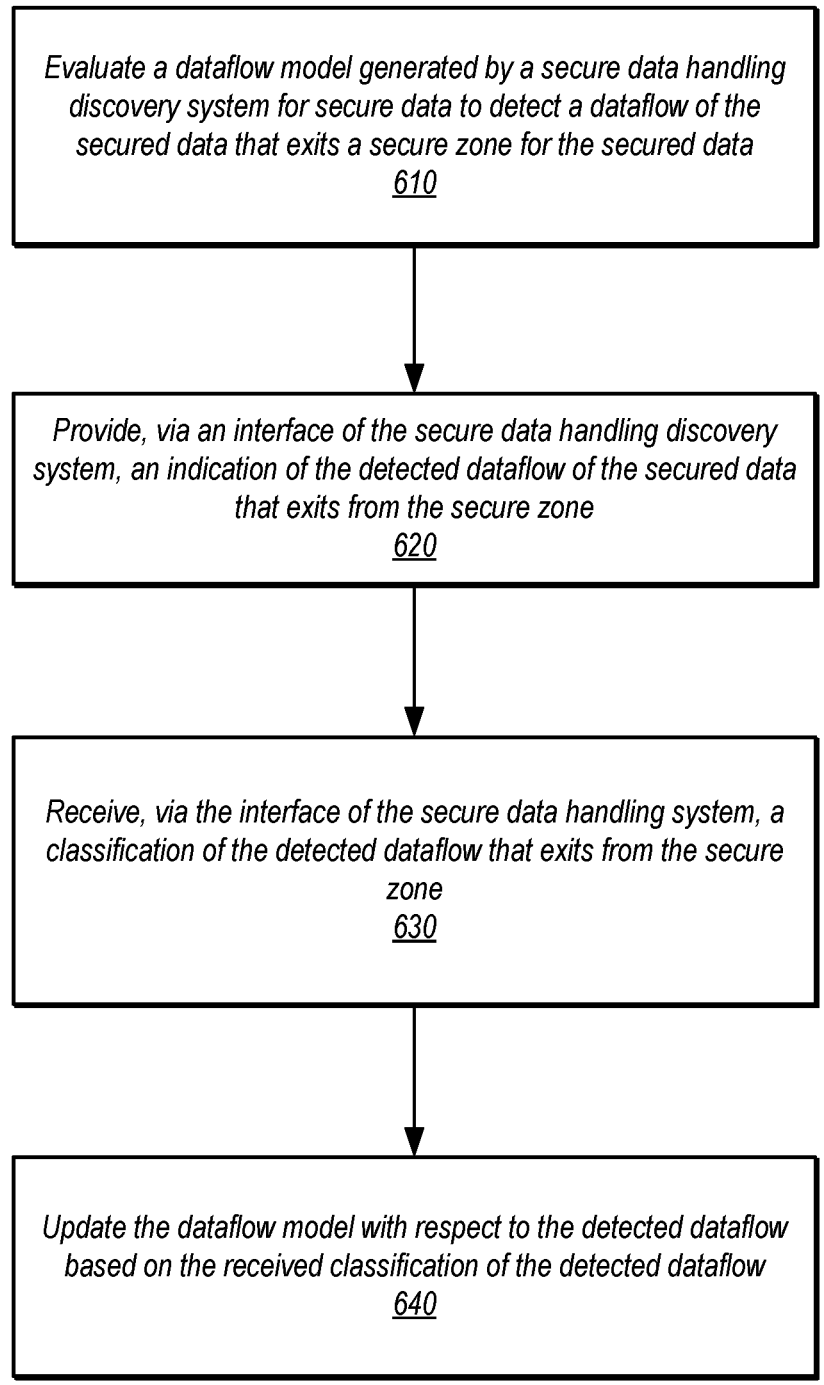
FIG. 6 is a high-level flowchart illustrating various methods and techniques to implement secure data handling discovery, according to some embodiments.

FIG. 6 is a high-level flowchart illustrating various methods and techniques to implement secure data handling discovery, according to some embodiments. In various embodiments, a dataflow model, generated by a secure data handling discovery system for secure data may be evaluated to detect a dataflow of the secure data that exits a secure zone for the secure data, as indicated at 610. For example, as discussed in detail above with regard to FIGS. 1 and 3, as well as FIG. 7 below, a dataflow model may be created for secure data of an application using specified secure data and the application, including application code and a configuration of the application (e.g., network configuration, access control configuration, service configuration, etc.). The initial model may be created (and subsequently updated) to identify a secure zone as those computing resources which have access to secure data, and which themselves are to be treated as secure for the purposes of determining whether a dataflow from that resource should be permitted in order to maintain security of the secure data. A secure zone may be represented as a collection of node(s) (and edges between them representing secure data and computing resource use locations of an application). An exit from the secure zone may be detected according to the evaluation when, as discussed above with regard to FIG. 4, access is provided to secure data from outside the secure zone.

As indicated at 620, an indication of the detected data flow that exits from the secure data zone may be provided via an interface of the secure data handling discovery system, in some embodiments. For example, various different types of interfaces may be utilized, such as a command line interface, graphical user interface, programmatic interface (e.g., via an API) may be used to provide the indication. In some embodiments, a warning or notification may be generated and sent using various types of communication systems (e.g., electronic mail, SMS or other mobile device messaging system) or displayed in a console or other view of deployment or development system that may have caused the evaluation. Various information about the detected dataflow may be provided, such as the name, type, location, or other information about a computing resource that is the destination of the exiting dataflow (e.g., outside of the secure zone). Another example of information that may be provided is the source or cause of the exit (e.g., an access control policy, a networking configuration, or application code location).

As indicated at 630, a classification of the detected dataflow that exits from the secure zone may be received via the interface of the secure data system, in some embodiments. As discussed above with regard to FIG. 1, various different classifications of the dataflow may be provided. For example, a classification may be to identify the destination resource as within the secure zone, and thus may cause the resource to be added to the secure zone. Another example classification may be to identify the exit as expected, and thus no corrective action may be needed. In some embodiments, other classifications may provide information for future development or deployment decisions. For example, a classification could identify a potentially problematic exit to be addressed in a next version of the application.

As indicated at 640, the dataflow model may be updated with respect to the detected dataflow based on the received classification of the detected dataflow, in some embodiments. For example, the stored dataflow model may be updated to include the classification of the expected exit, such as updating a graph of resources within a secure zone to include a new node corresponding to a new resource, to label or identify an edge between nodes or exiting the secure zone as expected, or various other updates as discussed above with regard to FIG. 1B.

Figure 7:
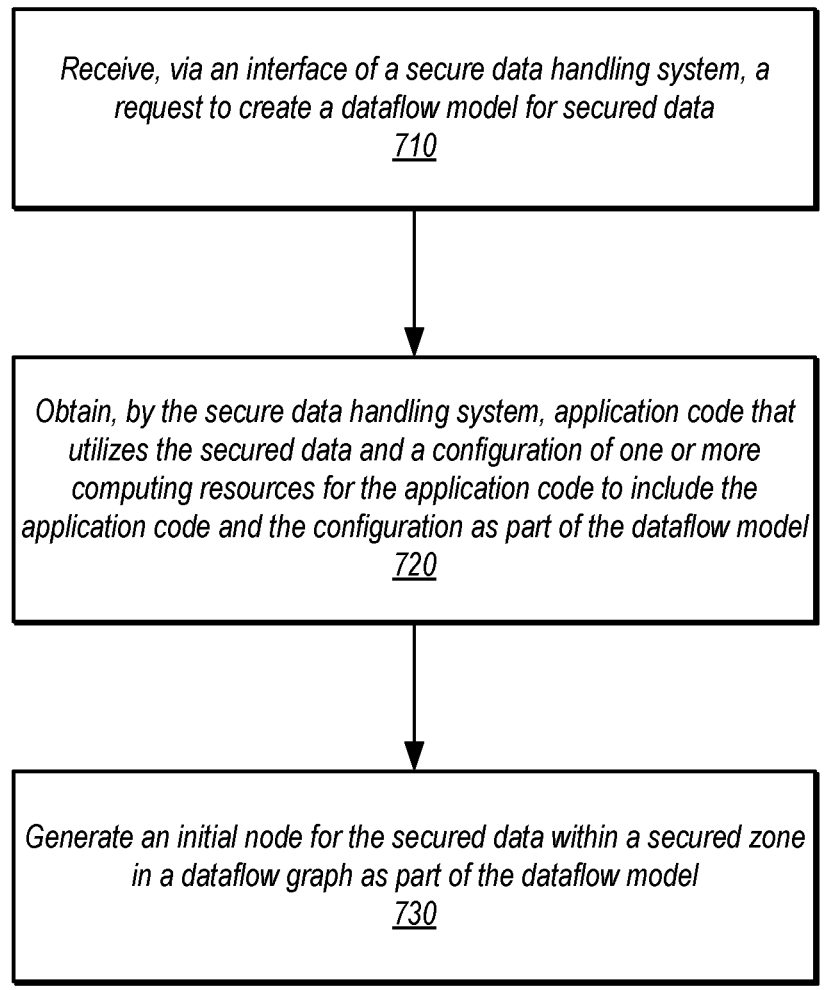
FIG. 7 is a high-level flowchart illustrating various methods and techniques to implement creating a dataflow model for secure data, according to some embodiments.

The techniques described above with regard to FIG. 6 may be performed many times through manual or automated triggers that cause evaluation of a dataflow model. In this way, the dataflow model can be updated and used to discover additional resources within the secure zone or other potentially problematic exits of secure data. FIG. 7 is a high-level flowchart illustrating various methods and techniques to implement creating a dataflow model for secure data, according to some embodiments. As indicated at 710, a request to create a dataflow model for secure data may be received via an interface of a secure data handling system. As discussed above with regard to FIGS. 1 and 3, a request to create a dataflow model may identify secure data and an application that uses the secure data. In this way, the secure zone for the secure data can be initialized and subsequently evaluated (as discussed above).

Various initialization operations may be performed. For example, as indicated at 720, application code may be obtained that utilizes the secure data and a configuration of one or more computing resources for the application code to include the application code and the configuration of the application as part of the dataflow model. This information can be obtained from code repositories, snapshots or other states of an application, from one (or more) services or systems, that host or implement portions (or all) of the application, in some embodiments.

As indicated at 730, an initial node for the secure data within a secured zone in a dataflow graph may be generated as part of the dataflow model, in some embodiments. For example, a graph data structure that defines nodes and edges between nodes may be created and updated to include an initial node for the secure data. In some embodiments, the secure data could be found or stored at multiple locations, which can all be included in the initialized version of the dataflow graph of the data flow model.

Figure 8:
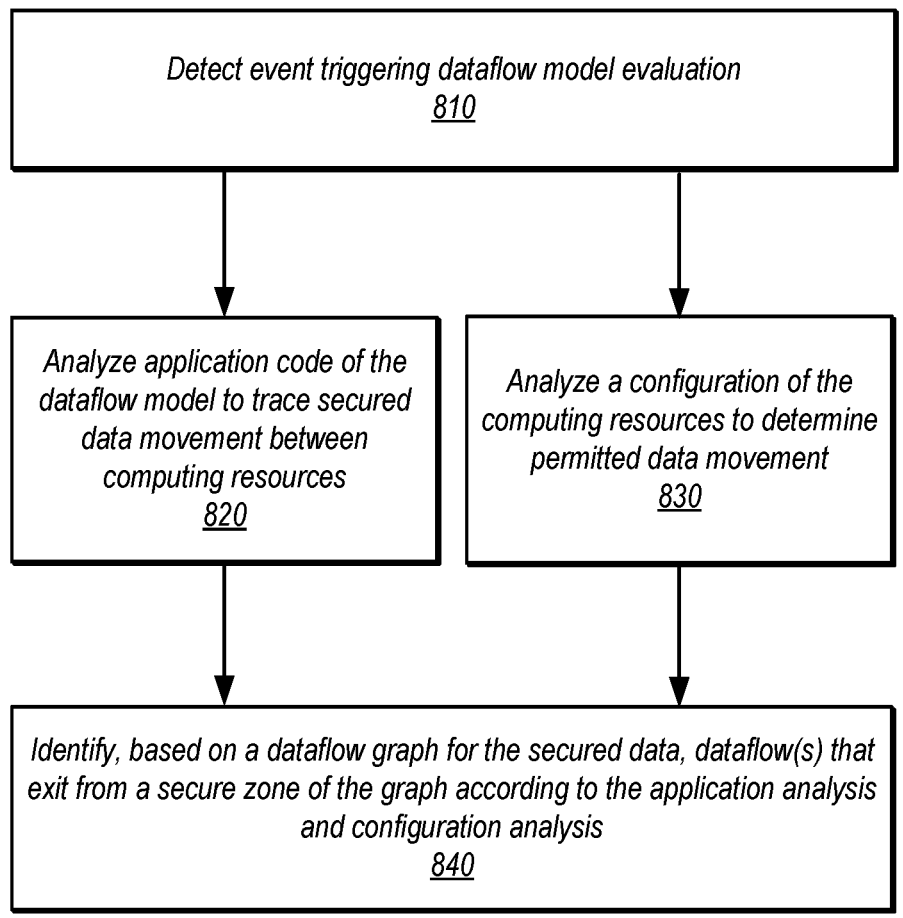
FIG. 8 is a high-level flowchart illustrating various methods and techniques to implement evaluating a dataflow model evaluation, according to some embodiments.

FIG. 8 is a high-level flowchart illustrating various methods and techniques to implement evaluating a dataflow model evaluation, according to some embodiments. As indicated at 810, an event triggering data flow model evaluation may be detected, in some embodiments. For example, as discussed above with regard to FIGS. 4 and 6, dataflow model evaluation may be triggered when development events or other updates, such as checking in, compiling, or otherwise adding new application code. Similarly, a deployment update may trigger dataflow model evaluation, such as a request to add a current resource or other object (e.g., adding a new microservice, adding a new storage resource, adding a new monitoring/logging resource, etc.). A triggering event may also be a request to perform evaluation.

As indicated at 820, application code of the dataflow model may be analyzed to trace secure data movement between computing resources, according to some embodiments. For example, a search for functions that read, write, modify, or otherwise access resources that store secure data (or an object, data, or filename of secure data itself) may be performed upon application code. Various text search or code analysis tools may be performed to implement the trace.

As indicated at 830, a configuration of the computing resources may be analyzed to determine permitted data movement, in some embodiments. For example, as discussed above with regard to FIG. 4, application configuration may include access control, network, or other resource/service configuration information. Different types of analysis may be performed to determine what actions (such as access actions), connections, or operations are permitted according to the configuration that allow or support access to the secure data.

As indicated at 840, based on a dataflow graph for the secure data, one or more dataflows may be identified that exit from a secure zone of the graph according to the application analysis and the configuration analysis, in some embodiments. For example, as discussed above with regard to FIG. 4, various rule sets or other heuristics to determine how the code, network configuration, and/or access policies affect exits form from a secure zone. Rule sets may be used, for instance to aggregate or interpret the results of individual types of analysis (e.g., code analysis may identify a possible exit, but then network configuration and/or access control configuration may be used to identify whether the particular resource performing that perform the code of the possible exit have or do not have permission to access the secure data). Various other rules or aggregation analysis may be performed that include determinations about how computing resources can receive, store and send data, how the various types of analysis interact (e.g., network configuration interactions with access control), and the input or exit of data from application boundaries.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
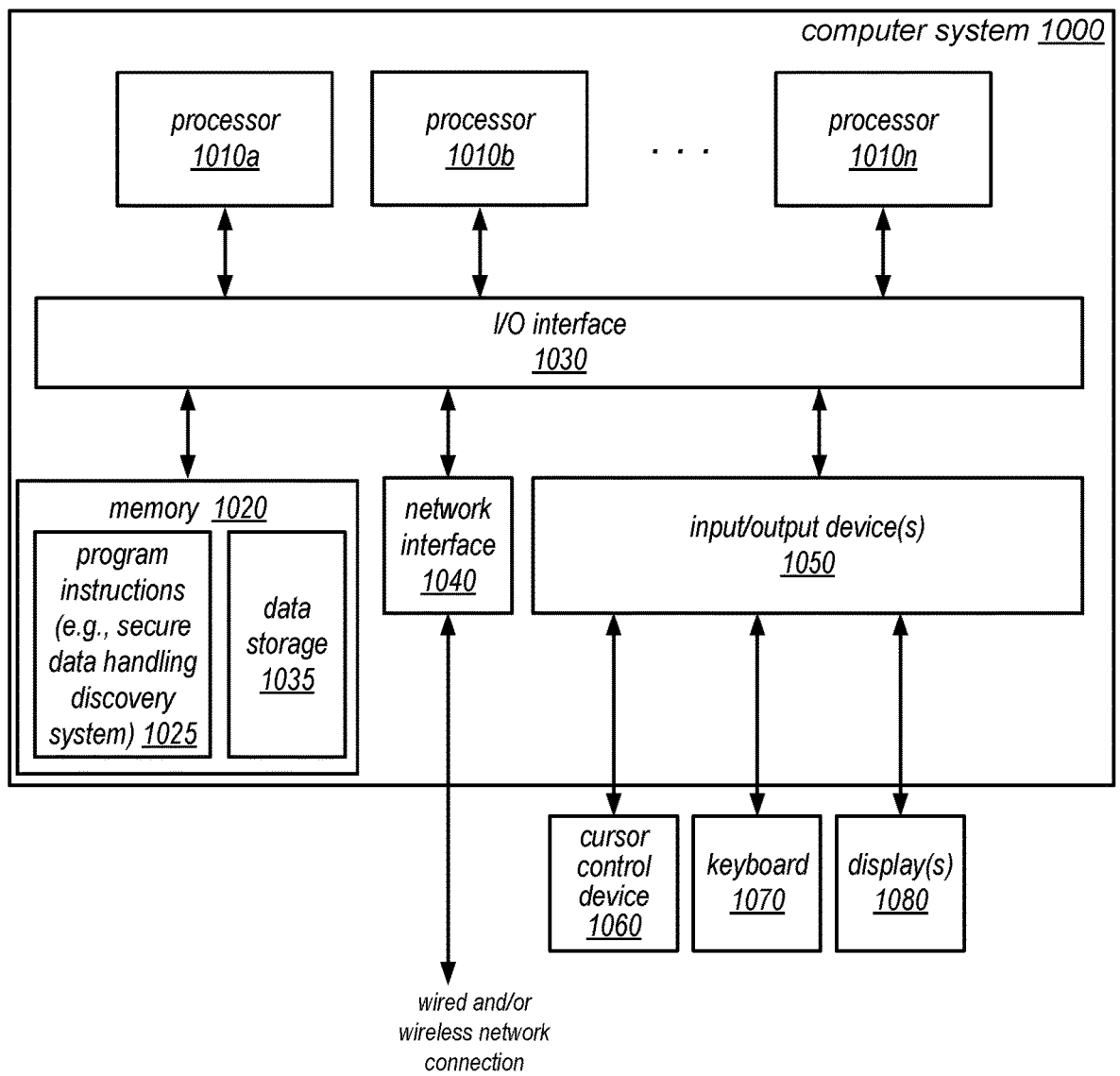
FIG. 9 illustrates an example system configured to implement the various methods, techniques, and systems described herein, according to some embodiments.

Embodiments of secure data handling discovery as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of compute node, computing device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., policy validators and/or other features of identity and access control systems, services or other systems that implement resource state validation of access control policies) are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, configured to implement the various methods and techniques as described herein, and data storage 1035, comprising various data accessible by program instructions 1025. In one embodiment, program instructions 1025 may include software elements of embodiments as described herein, such as a secure data handling discovery system or other secure data handling discovery techniques, and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, nodes within a data lineage system may present data lineage services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a secure data handling discovery system, configured to:
   detect an event that triggers evaluation of a dataflow model generated for secure data, wherein the dataflow model describes use and movement of the secure data across one or more computing resources;
   evaluate the dataflow model for the secure data to detect a dataflow of the secure data that exits from a secure zone for the secure data;
   provide, via an interface of the secure data handling discovery system, an indication of the detected dataflow of the secure data that exits from the secure zone;
   receive, via the interface of the data handling discovery system, a classification of the detected dataflow that exits from the secure zone; and
   update, by the secure data handling discovery system, the dataflow model with respect to the detected dataflow based on the classification of the detected dataflow.

2. The system of claim 1, wherein the secure data handling discovery system is further configured to create the dataflow model for the secure data in response to a request to create the dataflow model received via the interface of the secure data handling system, wherein the request to create the dataflow model specifies an initial location for the secure data to generate an initial node in a dataflow graph as part of the dataflow model.

3. The system of claim 1, wherein to evaluate the dataflow model, the secure data handling discovery system is configured to:

analyze application code maintained as part of the dataflow model to trace movement of the secure data between computing resources;

analyze a configuration of the one or more computing resources to determine permitted data movement; and based on a dataflow graph maintained as part of the dataflow model, identify the detected dataflow according to the analysis of the application code and the analysis of the configuration of the one or more computing resources.

4. The system of claim 1, wherein the evaluating is performed in response to adding in accordance with a request received via the interface of the secure data handling system, a new resource to the secure zone.

5. A method, comprising:

evaluating, by a secure data handling discovery system, a dataflow model generated by the secure data handling discovery system for secure data to detect a dataflow of the secure data that exits from a secure zone for the secure data, wherein the dataflow model describes use and movement of the secure data across one or more computing resources;

providing, via an interface of the secure data handling discovery system, an indication of the detected dataflow of the secure data that exits from the secure zone;

receiving, via the interface of the data handling discovery system, a classification of the detected dataflow that exits from the secure zone; and updating, by the secure data handling discovery system, the dataflow model with respect to the detected dataflow based on the classification of the detected dataflow.

6. The method of claim 5, wherein evaluating the dataflow model comprises:

analyzing application code maintained as part of the dataflow model to trace movement of the secure data between computing resources;

analyzing a configuration of the one or more computing resources to determine permitted data movement; and based on a dataflow graph maintained as part of the dataflow model, identify the detected dataflow according to the analysis of the application code and the analysis of the configuration of the one or more computing resources.

7. The method of claim 5, wherein the evaluating is performed in response to adding in accordance with a request received via the interface of the secure data handling system, a new resource to the secure zone.

8. The method of claim 5, wherein the classification identifies a destination of the detected dataflow as part of the secure zone for the secure data.

9. The method of claim 5, wherein the evaluating is performed in response to a development update to application code obtained by the secure data handling system.

10. The method of claim 5, further comprising creating the dataflow model for the secure data in response to a request to create the dataflow model received via the interface of the secure data handling system, wherein the request to create the dataflow model specifies an initial location for the secure data to generate an initial node in a dataflow graph as part of the dataflow model.

11. The method of claim 5, wherein the classification identifies the dataflow as an expected exit from the secure zone.

12. The method of claim 5, wherein the evaluation identifies a second dataflow that exits from the secure zone, wherein the evaluation is performed again responsive to a request to perform the evaluation, and wherein the second dataflow is not detected after the second performance of the evaluation.

13. The method of claim 5, wherein the one or more computing resources are implemented as part of one or more services offered by a provider network.

14. One or more non-transitory, computer-readable storage media, storing program instructions that when executed on or across one or more computing devices cause the one or more computing devices to implement:

responsive to a detected event:

causing a dataflow model generated by a secure data handling discovery system for secure data to be evaluated, wherein the evaluation detects a dataflow of the secure data that exits from a secure zone for the secure data, wherein the dataflow model describes use and movement of the secure data across one or more computing resources;

providing, via an interface of the secure data handling discovery system, an indication of the detected dataflow of the secure data that exits from the secure zone;

receiving, via the interface of the data handling discovery system, a classification of the detected dataflow that exits from the secure zone; and updating, by the secure data handling discovery system, the dataflow model with respect to the detected dataflow based on the classification of the detected dataflow.

15. The one or more non-transitory, computer-readable storage media of claim 14, wherein the classification identifies a destination of the detected dataflow as part of the secure zone for the secure data.

16. The one or more non-transitory, computer-readable storage media of claim 14, wherein, in evaluating the dataflow model, the program instructions cause the one or more computing devices to implement:

analyzing application code maintained as part of the dataflow model to trace movement of the secure data between computing resources;

analyzing a configuration of the one or more computing resources to determine permitted data movement; and based on a dataflow graph maintained as part of the dataflow model, identify the detected dataflow according to the analysis of the application code and the analysis of the configuration of the one or more computing resources.

17. The one or more non-transitory, computer-readable storage media of claim 14, wherein the event is a deployment update.

18. The one or more non-transitory, computer-readable storage media of claim 14, storing further instructions that when executed on or across the one or more computing devices, cause the one or more computing devices to implement creating the dataflow model for the secure data in response to a request to create the dataflow model received via the interface of the secure data handling system, wherein the request to create the dataflow model specifies an initial location for the secure data to generate an initial node in a dataflow graph as part of the dataflow model.

19. The one or more non-transitory, computer-readable storage media of claim 14, wherein the evaluation is performed in response to adding in accordance with a request received via the interface of the secure data handling system, a new resource to the secure zone.

20. The one or more non-transitory, computer-readable storage media of claim 14, wherein the one or more computing resources are implemented as part of one or more services offered by a provider network.

\* \* \* \* \*